United States Patent [19]
Makino et al.

[11] Patent Number: 6,149,885
[45] Date of Patent: Nov. 21, 2000

[54] METHOD FOR PURIFYING A NICKEL SULFATE SOLUTION BY SOLVENT EXTRACTION

[75] Inventors: Susumu Makino; Naoyuki Tsuchida; Atsushi Goda; Sunao Kanesaka; Masaki Imamura, all of Niihama; Kazuyuki Takaishi, Uma-gun; Yoshitomo Ozaki, Niihama, all of Japan

[73] Assignee: Sumitomo Metal Mining Co., Ltd., Tokyo, Japan

[21] Appl. No.: 09/067,020

[22] Filed: Apr. 28, 1998

[30] Foreign Application Priority Data

Apr. 30, 1997 [JP] Japan ..................................... 9-126347
Apr. 30, 1997 [JP] Japan ..................................... 9-126949

[51] Int. Cl.$^7$ ........................... C22B 23/00; C01G 53/00; C01B 17/96
[52] U.S. Cl. ............................................ 423/139; 423/544
[58] Field of Search ..................................... 423/139, 544, 423/181; 210/634

[56] References Cited

U.S. PATENT DOCUMENTS

| | | | |
|---|---|---|---|
| 3,336,133 | 8/1967 | Funatsu et al. | 423/139 |
| 4,600,435 | 7/1986 | Wiegers et al. | 423/139 |
| 4,900,522 | 2/1990 | Chou et al. | 423/139 |
| 5,470,553 | 11/1995 | Hao-chung et al. | 423/139 |
| 5,888,462 | 3/1999 | Makino et al. | 423/139 |

*Primary Examiner*—Steven Bos
*Attorney, Agent, or Firm*—Dykema Gossett PLLC

[57] ABSTRACT

A method of purifying a crude nickel sulfate solution to give pure nickel sulfate through solvent extraction, in which the impurities such as cobalt, calcium, magnesium, iron, zinc, copper, sodium, ammonia and others to be in the crude solution are removed while, if necessary, effectively recovering cobalt, and for which the amount of a neutralizer to be used is reduced and the cost of treating wastewater is also reduced includes an extraction step of adding an organic acid extractant to a crude nickel sulfate solution to thereby extract nickel into the extractant to give a nickel-loaded organic phase, followed by a scrubbing step of scrubbing the organic phase as obtained in the previous extraction step with a nickel-containing scrub solution to thereby remove sodium and ammonia from the organic phase; and a second purifying step of adding a crude nickel sulfate solution to the nickel-retaining organic phase as obtained in the previous first purifying step so as to exchange the nickel in the organic phase with the impurities except sodium and ammonia existing in the crude nickel sulfate solution added in this step, thereby giving a purified nickel sulfate solution and an organic phase containing impurities; and optionally a third purifying step of recovering nickel from the organic the organic phase containing impurities as obtained in the second purifying step, and a step of recovering a valuable metal, cobalt from the organic phase containing impurities.

8 Claims, 1 Drawing Sheet

Fig. 1

METHOD FOR PURIFYING A NICKEL SULFATE SOLUTION BY SOLVENT EXTRACTION

BACKGROUND OF THE INVENTION

1. Field of the Invention

The present invention relates to a method for removing impurities from a crude nickel sulfate material containing impurities such as ammonia, sodium, cobalt, iron, copper, zinc, calcium, magnesium and others, the impurities to obtain a highly-purified nickel sulfate solution while optionally recovering cobalt.

2. Description of the Prior Arts

Nickel sulfate is industrially used not only in ordinary electroplating but also in electroless nickel plating for producing computer hard discs. In addition, nickel sulfate has been recently used as the nickel material for secondary batteries.

For some of those uses, the amount of impurities such as ammonia, sodium, cobalt, iron, zinc, copper, calcium, magnesium and others that may exist in nickel sulfate must be reduced as much, as possible. Purification of crude nickel sulfate is generally effected through solvent extraction. For this, in general, employed is a method of extracting the impurities existing in a crude nickel sulfate solution into an acid extractant, for example, an organic, phosphorus-containing acid extractant such as a phosphric acid ester or a phosphric acid ester to remove the impurities, thereby giving a purified nickel sulfate solution; or a method of extracting nickel from a crude nickel sulfate solution into such an extractant followed by stripping the nickel-loaded organic phase with sulfuric acid to obtain a purified nickel sulfate solution. Those extraction methods using such an acid extractant require a neutralizer such as sodium hydroxide or ammonia, as hydrogen ions are released therein during extraction of the impurities from the crude nickel sulfate solution into the extractant or during extraction of nickel from the solution into the extractant.

For example, in the former method of extracting the impurities from the crude nickel sulfate solution into the acid extractant used therein, the pH of the extraction system is so controlled that the impurities of cobalt, calcium, iron, zinc, copper and others, for which the extraction pH is lower than that for nickel, could be selectively extracted into the extractant and separated and removed from the nickel sulfate solution to give a purified nickel sulfate solution. In this, however, the neutralizer necessary for the extraction reaction is problematic in that $Na^+$ or $NH_4^+$ ions released from it move into the nickel sulfate solution to contaminate the purified nickel sulfate solution.

On the other hand, in the latter method where nickel is selectively extracted from a crude nickel sulfate solution containing such impurities into the acid extractant used therein, impurity elements to be extracted at a pH lower than that for the nickel extraction shall also be extracted into the acid extractant along with nickel. In addition, in this, the nickel extraction will be inevitably accompanied by some sodium and ammonia extraction. Moreover, as so mentioned above, this method inevitably requires a neutralizer for controlling the pH of the extraction system, resulting in that the organic phase as finally separated in the method shall contain all impurities. In general, the organic phase is stripped with sulfuric acid to recover nickel from it, but it is difficult to remove all those impurity elements through the stripping.

Accordingly, the nickel loaded organic phase is strongly scrubbed to remove sodium and ammonia therefrom. To remove the other impurities, nickel sulfate obtained as a result of the stripping with sulfuric acid is further again extracted with different extractants. Anyhow, such repurification must be repeated to extract and remove the respective impurities. Therefore, the conventional methods are extremely uneconomical in that the scrubbing of the nickel-loaded organic phase requires a large amount of scrub solution and requires additional treatment of the scrub raffinate, while being accompanied by nickel loss, and that the additional extraction to remove cobalt and other impurities from the phase requires different solvent extraction devices. On the other hand, a crude nickel sulfate solution to be purified often contains a relatively large amount of cobalt, and cobalt that shall remain in the organic phase to be separated as a result of extraction of the solution is a valuable metal. Economically, therefore, efficient recovery of cobalt is desired.

SUMMARY OF THE INVENTION

The object of the present invention is to provide a method of purifying a crude nickel sulfate solution to give pure nickel sulfate through solvent extraction, in which the impurities such as cobalt, calcium, magnesium, iron, zinc, copper, sodium, ammonia and others to be in the crude solution are removed while, if necessary, effectively recovering cobalt, and for which the amount of a neutralizer to be used is reduced and the cost of treating wastewater is also reduced.

The invention that attains the object as above is characterized by a method of purifying a crude nickel sulfate solution that contains impurities such as sodium, ammonia, cobalt, calcium, copper, zinc, iron and others to give pure nickel sulfate, which comprises a first purifying step comprising an extraction step of adding an organic acid extractant to a crude nickel sulfate solution to thereby extract nickel into the extractant to give a nickel-loaded organic phase, followed by a scrubbing step of scrubbing the organic phase as obtained in the previous extraction step with a nickel-loaded scrub solution to thereby remove sodium and ammonia from the organic phase, and a second purifying step of adding a crude nickel sulfate solution to the nickel-retaining organic phase as obtained in the previous first purifying step so as to exchange the nickel in the organic phase for the impurities except sodium and ammonia existing in the crude nickel sulfate solution added in this step, thereby giving a purified nickel sulfate solution and an organic phase containing impurities.

In the invention, preferably, a crude nickel sulfate solution containing a relatively large amount of impurities of sodium and ammonia is used in the first purifying step, while a crude nickel sulfate solution containing a relatively small amount of sodium and ammonia is used in the second purifying step.

Also preferably, in the invention, the nickel content of the nickel-loaded organic phase to be obtained in the extraction step is made larger than the stoichiometric nickel loading capacity of the organic acid extractant used therein.

The invention comprises the two purifying steps to give pure nickel sulfate having a high purity, and may optionally comprise an additional third purifying step of adding diluted sulfuric acid to the organic phase-containing impurities as obtained in the second purifying step to strip nickel remaining in the organic phase containing impurities into the diluted sulfuric acid, thereby giving a purified nickel sulfate solution and an organic phase with concentrated impurities.

In the third purifying step, a part or all of the purified nickel sulfate solution as obtained may be optionally recycled to the second purifying step in which the thusrecyled solution is used as a part of the nickel sulfate solution for the exchange therein. Further optionally, the organic phase with concentrated impurities as obtained in the third purifying step may be subjected to a cobalt-recovering step where hydrochloric acid is added to the organic phase to thereby strip cobalt existing in the organic phase into the hydrochloric acid added to recover cobalt as cobalt chloride. This cobalt-recovering step is an optional one, and is extremely effective in the invention for purifying a crude nickel sulfate solution having a large cobalt content.

The organic phase having been subjected to the cobalt-recovering step and therefore containing impurities except cobalt may be scrubbed, and then processed with sulfuric acid to thereby strip the impurities except cobalt into the sulfuric acid so as to remove the impurities from the organic phase, and a part of the resulting, impurities-free organic phase may be recycled to the extraction step in the first purifying step to be used therein as a part of the organic acid extractant. In this embodiment, the amount of the organic acid extractant to be used may be reduced. The remaining part of the impurities-free organic phase may be added to the nickel-loaded organic phase as obtained in the scrubbing step in the first purifying step so as to dilute and control the impurities in the organic phase.

DETAILED DESCRIPTION OF THE INVENTION

As mentioned above, the method for producing pure nickel sulfate of the invention is characterized by comprising a first purifying step that comprises an extraction step of using an organic acid extractant to extract nickel thereinto from a crude nickel sulfate solution containing a large amount of impurities, such as sodium, ammonia and others to be extracted into the extractant at a pH higher than the pH at which nickel is extracted thereinto, to thereby obtain a nickel-loaded organic phase, followed by a scrubbing step of scrubbing the nickel-loaded organic phase as obtained in the previous extraction step, with a scrub solution, and a second purifying step of adding a crude nickel sulfate solution to the scrubbed, nickel-loaded organic phase as obtained in the previous first purifying step so as to exchange the nickel in the organic phase for the impurities except sodium and ammonia existing in the crude nickel sulfate solution added in this step, thereby giving a purified nickel sulfate solution and an organic phase containing impurities.

Now, the technical idea on which the invention is based is described hereinunder. As so mentioned hereinabove, the solvent extraction of a crude nickel sulfate solution that contains iron, zinc, copper, cobalt, sodium, ammonia and other impurities, using an organic acid extract, so as to extract the impurities or nickel into the extractant requires a neutralizer such as typically sodium hydroxide or ammonia, in which, therefore, the purified nickel sulfate solution is unfavorably contaminated with the neutralizer used.

The crude nickel sulfate solution to be purified through such solvent extraction using an organic acid extractant may be grouped into two, depending on the production history thereof; one containing a relatively large amount of sodium, ammonia and the like impurities that shall be extracted into the extractant at a pH higher than that at which nickel is extracted thereinto, and the other containing a relatively small amount of sodium and ammonia but containing a large amount of cobalt, iron, copper, zinc, calcium, magnesium and the like impurities that shall be extracted into the extractant at a pH lower than that at which nickel is extracted thereinto.

Utilizing the extraction characteristics as above of the impurities to be in a crude nickel sulfate solution, we, the present inventors have established the method of the invention for totally economically obtaining pure nickel sulfate from a crude nickel sulfate solution containing impurities, which is characterized by comprising solvent extraction and exchange as combined depending on the type of the starting crude nickel sulfate solution to be purified therein, and by which the impurities are efficiently removed from the crude nickel sulfate solution while efficiently recovering the valuable metal to be in the solution, especially cobalt, from the solution.

Specifically, in the invention using an organic acid extractant, a crude nickel sulfate solution containing a relatively large amount of impurities such as sodium and ammonia that shall be extracted into the extractant at a pH higher than that at which nickel is extracted thereinto, is subjected to the first extraction step where the crude solution is processed with such an organic acid extractant to thereby extract nickel from the solution into the extractant to prepare a nickel-loaded organic phase that contains a reduced amount of sodium and ammonia, and then the nickel-loaded organic phase is reacted with a crude nickel sulfate solution containing a large amount of impurities such as cobalt and others that shall be extracted at a pH lower than that at which nickel is extracted, so as to exchange the nickel existing in the nickel-loaded organic phase for the impurities except sodium and ammonia, such as cobalt, iron, copper, zinc, calcium, magnesium and others existing in the crude nickel sulfate solution thereby moving the majority of those impurities from the crude nickel sulfate solution into the organic phase to remove the impurities from the solution.

In the method of the invention, the nickel extraction step using the organic extractant in the first purifying step that requires a neutralizer is to prepare the nickel-loaded organic extractant which contains nickel in the organic phase and of which the nickel is exchanged for the impurities existing in the crude nickel sulfate solution in the next second purifying step, or that is, the exchange step. Therefore, being different from the conventional method of mere solvent extraction for purifying a crude nickel sulfate solution where nickel is extracted from the crude solution into the extractant used, the method of the invention is advantageous in that the amount of the neutralizer to be used is much reduced and the cost of treating wastewater discharged is also much reduced, and that, since no neutralizer is used in the exchange step, the purified nickel sulfate solution obtained in the exchange step is prevented from being contaminated with at least sodium and ammonium to be derived from a neutralizer.

In addition, in the second purifying step of the exchange, step in the method of the invention, the impurities except sodium and ammonium can be moved into the organic phase. Where the second purifying step of the exchange step is optionally combined with the third purifying step for selectively stripping the nickel still remaining in the organic phase containing impurities into sulfuric acid, the impurities are concentrated in the organic phase. Therefore, when a crude nickel sulfate solution containing a large amount of cobalt, which is a valuable metal, is purified according to the method of the invention comprising that third purifying step, the third step may further be followed by an additional step of stripping cobalt with hydrochloric acid to efficiently recover cobalt. In this embodiment, the overall economic effect of the purification of a crude nickel sulfate solution is much more enhanced.

Figure 1:
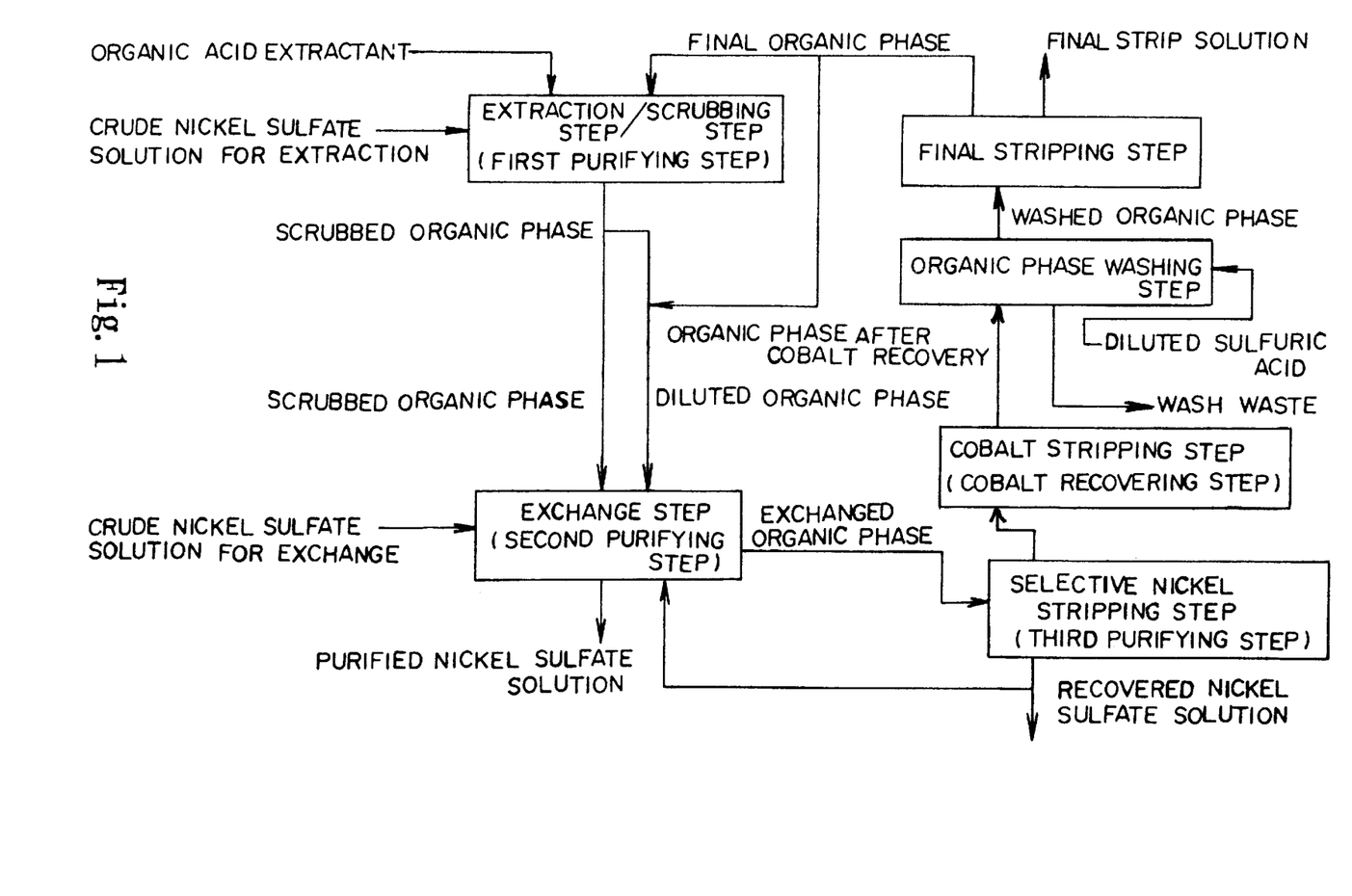
FIG. 1 is a flowchart illustrating one embodiment of the method for producing pure nickel sulfate of the invention.

FIG. 1 shows an outline of the flowchart of one embodiment of the method for purifying nickel sulfate of the present invention. Hereinunder described in detail the method for purifying nickel sulfate of the invention with reference to the flowchart in FIG. 1.

First Purifying Step

In the extraction step of the first purifying step, a crude nickel sulfate solution is subjected to solvent extraction using an organic acid extractant to thereby extract nickel from the solution into the extractant to prepare a nickel-retaining organic phase. In this, therefore, a nickel chloride solution, a nickel sulfate solution or the like may be used as the nickel source, except for the nickel sulfate solution. However, in view of the object of the invention and of the easy availability of the starting solution, a crude nickel sulfate solution is reasonably used in the invention.

For the nickel extraction, employed are any ordinary multi-stage, counter-current solvent extraction systems such as multi-stage, counter-current mixer-settlers and the like, which are generally used in ordinary solvent extraction. To the uppermost stage of the extraction system of that type, fed is an organic acid extractant, while a crude nickel sulfate solution to be purified is to the lowermost stage of the system, in which the two are contacted with each other in a counter-current flow condition to attain the intended extraction reaction therebetween. The organic acid extractant to be used is not specifically defined. For example, employed is an organic phosphorus-containing, acid extractant, such as CYANEX 272 (bis(2,4,4-trimethyl pentyl) phosphinic acid), D2EHPA (bis(2-ethylhexyl)phosphoric acid, PC-88A (2-ethylhexyl phosphonic acid mono-2-ethylhexyl ester) (all trade names of commercially-available products), etc.

After the extraction, it is important that nickel does not remain in the extraction raffinate as much as possible. For this, for example, it is desirable that the pH of the extraction system is kept to fall within a high pH range of from 6.5 to 7.0, which is higher than the pH range of from 5.5 to 6.5 within which nickel is generally extracted. In addition, it is also desirable to keep as high as possible the nickel content of the nickel-loaded organic phase to be obtained as a result of the nickel extraction. This is based on the new finding of the present inventors, which is that, even though the nickel extraction into an organic acid extractant within such a high pH range may be accompanied by the extraction of sodium and ammonia into the extractant together with nickel, the higher concentration of nickel in the resulting organic phase to such a degree that the nickel content of the organic phase is higher than the intrinsic stoichiometric nickel loading capacity of the extractant reduces the amount of sodium and ammonium to be extracted in the organic phase. Therefore, it is desirable that the amount of the organic acid extractant to be added to the crude nickel sulfate solution in the extraction step is minimized as much as possible. The nickel-retaining organic phase formed in the extraction step shall contain the majority of the impurities, such as cobalt, iron, copper, zinc, calcium, magnesium and others which have existed in the crude nickel sulfate solution and which are extracted into the extractant at a pH lower than that for the nickel extraction.

The nickel-loaded organic phase as obtained in the extraction step is then transferred to the next scrubbing step. In the scrubbing step, the nickel-loaded organic phase is scrubbed with a nickel-containing scrub solution. In this step, a nickel-containing scrub solution is used for scrubbing the organic phase. This is based on the inventors' new finding that sodium and ammonia are more effectively removed from the nickel-containing, organic extract phase by scrubbing the extract phase with such a nickel-containing scrub solution than by scrubbing it with ordinary scrub solution, since the exchange reaction between nickel in the nickel-containing scrub solution and sodium and ammonium existing in the nickel-loaded organic phase promotes the removal of sodium and ammonium from the extract phase.

The nickel-containing scrub solution to be used in the scrubbing step may be prepared, for example, by diluting a nickel sulfate solution with water to have a nickel content of generally from 10 to 20 g/liter, but the nickel concentration therein is not specifically defined to such a degree. Depending on the sodium and ammonia content of the solution, the degree of dilution of the solution may be varied. The scrub raffinate to be discharged in the scrubbing step can be directly recyclced to the previous extraction step, and any additional treatment of the wastewater from the scrubbing step is unnecessary.

Second Purifying Step

After having been scrubbed in the scrubbing step, the nickel-loaded organic phase is transferred to the next second purifying step of the exchange step. For this exchange step, a continuous, multi-stage counter-current reaction system such as a multi-stage counter-current mixer-settler having at least three reactors is used. For example, using a three-stage counter-current mixer-settler system for the exchange reaction, the nickel-loaded organic phase is fed to the uppermost stage, or that is, the first-stage mixer settler, while a crude nickel sulfate solution is to the lowermost stage, or that is, the third-stage mixer settler, and the two are reacted in a counter-current flow condition in the system. In that manner, nickel in the nickel-loaded organic phase is exchanged with the impurities, such as cobalt, iron, copper, zinc, calcium, magnesium and others existing in the crude nickel sulfate solution through exchange reaction therebetween, whereby nickel in the organic phase is moved into the aqueous phase while cobalt and other impurities in the crude nickel sulfate solution is into the organic phase. Accordingly, as a result of the exchange reaction, obtained are the aqueous phase comprising a purified nickel sulfate solution and the impurities-containing organic phase that contains a large amount of the impurities.

In the exchange step, the impurity content of the nickel-loaded organic phase to be processed must be lowered. This is because, if the nickel-loaded organic phase has a too high impurity content, the mobility of the impurities from the aqueous phase into the nickel-loaded organic phase is lowered when the impurity content of the aqueous phase is lowered. For this, it is desirable that a part of the nickel-loaded organic phase is diluted with a fresh organic acid extractant having the same organic phase composition as that of the organic phase or with the final organic phase to be obtained as a result of stripping of the organic phase containing impurities obtained in this exchange step, which will be referred to in detail hereinunder, to thereby control the impurity content of the nickel-loaded organic phase to be subjected to the exchange reaction in this step. The present inventors' experiments revealed that, in the extraction system using an organic acid extractant, where the cobalt content of the organic phase formed is larger than 11 g/liter, the viscosity of the organic phase is greatly increased to worsen the separability of the organic phase from the aqueous phase thereby interfering with the exchange reaction between the two phases. Therefore, the dilution of the nickel-loaded organic phase to be subjected to the exchange step is important for the purpose of preventing the cobalt content of the organic phase from being larger than 11 g/liter in the final stage of the exchange reaction in which the cobalt content of the organic phase containing impurities is to be the highest.

In the second purifying step, the exchange reaction between nickel and the impurities is preferably effected at a pH falling between 4 and 6. Being different from the extraction reaction in the previous extraction step in which hydrogen ions are released from the extractant used, the exchange reaction may be effected all the time in a suitable pH condition without requiring any pH control with a neutralizer. Accordingly, in this exchange step not using any neutralizer, the purified nickel sulfate solution is protected from being contaminated with sodium and ammonium.

The purified nickel sulfate solution is generally concentrated, and the resulting nickel sulfate crystals are recovered. Therefore, it is desirable that the nickel content of the pure nickel sulfate solution as obtained in the second purifying step is as high as possible. Where the impurities-containing, crude nickel sulfate solution is subjected to the exchange reaction with the nickel-loaded organic phase, the nickel content of the nickel-loaded organic phase must be higher in some degree than the impurity equivalent to be exchanged there for. If not, the movement of nickel from the nickel-loaded organic phase into the aqueous phase comprising a nickel sulfate solution through the exchange of nickel for the impurities in the solution will be difficult, resulting in that the intended exchange reaction between nickel and the impurities will be retarded. For this reason, accordingly, the nickel-loaded organic phase desirably has an excessive nickel content to such a degree that it may still contain some nickel after the exchange reaction.

The present inventors' experiment further revealed that, when the nickel content of the nickel-loaded organic phase to be subjected to the exchange reaction is not smaller than 1.3 equivalents relative to the amount of the impurities that exist in the crude nickel sulfate solution added to the step to be exchanged for nickel in the organic phase, then the amount of nickel that still remains in the organic phase having been subjected to the exchange reaction could be around 3 g/liter or so, and, in this case, the exchange reaction is effected smoothly, but when the nickel content in question is smaller than 1.3 equivalents relative to the same, then the pH value in the reaction system becomes 4 or lower to interfere with the exchange reaction. The amount of the impurities to be exchanged with nickel in the exchange reaction referred to herein indicates the total amount of the impurities which exist in the crude nickel sulfate solution to be added to the exchange step and which are to be extracted into an organic acid extractant at a pH lower than that at which nickel is extracted thereinto. The impurities include, for example, cobalt, iron, zinc, copper, cobalt, calcium, magnesium and the like.

In the nickel sulfate extraction of the invention, the first purifying step is, as so mentioned hereinabove, essentially directed to the separation and removal of the impurities of sodium and ammonia that exist in the starting, crude nickel sulfate solution and that are extracted into an acid extractant at a pH higher than that at which nickel is extracted thereinto, from the solution into the extraction raffinate after the first purifying step; while in the second purifying step, the nickel-loaded organic phase which has been obtained in the previous first purifying step and which contains the impurities except sodium and ammonia as derived from the starting crude solution is reacted with another crude nickel sulfate solution to thereby substitute the impurities existing in the crude nickel sulfate solution added herein with nickel existing in the nickel-loaded organic phase to thereby separate the impurities except sodium and ammonia into the organic phase (in other words, in this second purifying step, the separation and removal of sodium and ammonia is not almost effected). Therefore, it is necessary that the sodium and ammonia concentration in the crude nickel sulfate solution to be added in this second purifying step is minimized as much as possible. One object of the third purifying step, which may optionally follow the second purifying step and which will be referred to hereinunder, is to recover nickel from the organic phase, which has been obtained in the second purifying step and which contains the impurities except sodium and ammonia (this is hereinafter referred to as organic phase containing impurities), in the form of a purified nickel sulfate solution, while recirculating a part or all of the thus-recovered pure nickel sulfate solution to the second purifying step so as to lower the sodium and ammonia content of the crude nickel sulfate solution as added in the second purifying step for the exchange reaction to be effected therein.

Third Purifying Step, Cobalt Recovering Step, Organic Phase Scrubbing Step, and Final Stripping Step The pure nickel sulfate solution as obtained in the second purifying step is recovered as a final product, either directly or after having been concentrated into nickel sulfate crystals. The organic phase containing impurities (exchanged organic phase) as separated in the second purifying step may be subjected to a series of recovering process comprising a third purifying step for stripping of nickel, a cobalt recovering step for stripping of cobalt, an organic phase scrubbing step, and a final stripping step in that order, through which nickel still remaining in the organic phase is recovered, cobalt which is another valuable metal apart from nickel is recovered, and the impurities except cobalt are removed from the organic phase. Then, the thus-purified, final organic phase is recycled to the nickel extraction step of the first purifying step, in which the circulated organic phase is used as the organic acid extractant for extracting nickel from the crude nickel sulfate solution thereinto to give a nickel-loaded organic phase. If desired, a part of the final organic phase may be used as a diluent for the nickel-loaded organic phase which has been scrubbed in the first purifying step and is added to the exchange step of the second purification step.

In the nickel stripping to be effected in the third purifying step, sulfuric acid is added to and reacted with the exchanged organic phase which is discharged from the previous second purifying step, at a pH of about 4.0 or so, whereby the majority of nickel still remaining in the exchanged organic phase is selectively stripped into sulfuric acid. The aqueous phase obtained in this third purifying step is a solution consisting essentially of nickel sulfate, and it may be directly recovered. Preferably, however, a part or all of the aqueous solution is recycled to the second purifying step and is used therein as a part of the nickel sulfate solution to be subjected to the exchange reaction with the nickel-loaded organic phase in the step. By recycling the nickel sulfate solution obtained in the third purifying step to the second purifying step in that manner, the sodium and ammonia content of the crude nickel sulfate solution to be used in the second purifying step for the exchange reaction is reduced, whereby the purify of the pure nickel sulfate to be obtained in the second purifying step is much more increased.

The organic phase which contains concentrated impurities and from which has been removed nickel through stripping in the third purifying step (organic phase after nickel recovery) is then subjected to still another optional step for recovering cobalt therefrom, in which cobalt that is another valuable metal in addition to nickel is strippted by hydrochloric acid at a controlled pH value falling between 1.4 and 2.0, and is recovered as a cobalt chloride solution. Since the cobalt chloride solution contains calcium, magnesium, copper, zinc and the like that have been stripped thereinto along with cobalt, it must be further purified. The organic phase after the cobalt recovery is scrubbed with diluted sulfuric acid, and then subjected to a final stripping step, in which the organic phase is processed with 3 to 6 N sulfuric acid to thereby remove iron, zinc and other impurities therefrom. The final organic phase to be obtained as a result of the series of those recovering steps can be recovered as a pure, organic acid extractant with no impurities.

According to the present invention mentioned in detail hereinabove, a crude nickel sulfate solution to be purified, which contains impurities such as sodium, ammonium, cobalt, iron, zinc, copper, cobalt, calcium, magnesium and others, is processed with an organic acid extractant at a high pH falling between 6.5 and 7.0 to thereby extract nickel from the solution into the extractant to prepare a nickel-loaded organic phase, while the nickel content of the organic phase is kept to be not smaller than the stoichiometric nickel loading capacity of the extractant to thereby prevent the extraction of sodium and ammonium from the solution into the organic phase, and thereafter the nickel-loaded organic phase is reacted with a different crude nickel sulfate solution containing a relative small amount of sodium and ammonia but containing a large amount of other impurities to thereby exchange nickel in the nickel-loaded organic phase for the impurities except sodium and ammonia existing in the crude nickel sulfate solution to purify the crude nickel sulfate solution. The present invention is advantageous in that the amount of the neutralizer to be used is reduced, that the cost for treating wastewater to be discharged is reduced, and that a highly-purified nickel sulfate solution is obtained.

In addition, according to the present invention, cobalt which is another valuable metal in addition to nickel to be in a crude nickel sulfate solution can be concentrated in the organic phase to be obtained as a result of the exchange reaction. Where the exchange step is followed by an additional step of recovering cobalt from the organic phase, cobalt is effectively recovered. Thus, the method of the invention has the advantage of being economical in industrial purification of a crude nickel sulfate solution.

EXAMPLES

Now, the invention is described in more detail with reference to the following Examples, which, however, are not intended to restrict the scope of the invention.

Example 1

Herein made was an experiment to demonstrate the relationship between the condition for extracting nickel in the extraction step to give a nickel-loaded organic phase in the first purifying step and the effect of removing sodium and ammonium in the scrubbing step to follow the extraction step. In this experiment, used was PC-88A (trade name of a product of Dai-hachi Chemical Co.) diluted with CLEANSOL G (hexylbenzene) (trade name of a product of Nippon Petroleum Co.) to have a concentration of 20% (v/v), as the organic acid extractant. For the extraction, a continuous, two-stage counter-current mixer-settler system was used comprising two mixer-settlers as connected in series, in which the mixer zone of each mixer-settler had an effective capacity of 1.72 liters and the settler zone thereof had a capacity of 10.3 liters, and in which the organic acid extractant was fed to the first-stage mixer-settler and a starting, crude nickel sulfate solution was introduced into the second-stage mixer-settler so that nickel was extracted from the solution into the extractant in a counter-current flow condition. Since the behavior of sodium is nearly the same as that of ammonia in the purifying step of purifying the crude nickel sulfate solution, sodium was monitored in this experiment as the reaction behavior indicator.

The pH of the extraction system was 7.2 or 7.0, and 200 g/liter of sodium hydroxide was used as the neutralizer for controlling the pH. The extraction was conducted all the time at 40° C., for which each mixer-settler was kept in a water bath at the determined temperature. In this extraction experiment, the nickel content of the crude nickel sulfate solution to be introduced into the second-stage mixer settler was varied to fall between 9.3 and 34.6 g/liter, while the sodium content of the solution was fixed at 0.53 g/liter. The flow rate of the crude nickel sulfate solution was varied from 7.3 liters/hr to 10.0 liters/hr so as to vary the nickel content of the organic phase to be obtained. In the extraction step in this experiment having been conducted in that condition, the amount of sodium derived from the sodium-containing, crude nickel sulfate solution and applied to the extraction step was from 3.9 to 5.4 g/hr.

For the next scrubbing step that followed the extraction step in this experiment, used was a continuous, three-stage counter-current mixer-settler system comprising three mixer-settlers as connected in series, in which the construction of each mixer-settler was the same as that in the mixer-settler system used in the previous extraction step, and in which the nickel-loaded organic phase obtained in the extraction step was introduced into the first-stage mixer-settler while a nickel-containing scrub solution was into the third-stage mixer-settler to scrub the nickel-loaded organic phase. Table 1 below shows the data of the nickel content of the nickel-loaded organic phase as obtained in the extraction step, the flow rate of the nickel-loaded organic phase as transferred from the extraction step to the scrubbing step, the flow rate of the scrub solution as introduced into the scrubbing step and the nickel content of the scrub solution, the overall amount of nickel as introduced into the scrubbing step, the nickel content of the extraction raffinate, the flow rate of the extraction raffinate, and the pH of the extraction system. Table 2 below shows the data of the nickel content and the sodium content of the nickel-loaded organic phase scrubbed, the scrubbing ratio (flow rate of organic phase/flow rate of scrub solution), the concentration ratio of Na/Ni in the scrub solution, the concentration ratio of Na/Ni in the scrub solution, and the degree of sodium removal.

TABLE 1

| Ni Content of Organic Phase (g/l) | Flow Rate of Organic Phase (1/hr) | Scrub Solution | | Total Ni Introduced into Scrubbing Step (g/hr) | Extraction Raffinate | | Extraction pH |
|---|---|---|---|---|---|---|---|
| | | Flow Rate (1/hr) | Ni Content (g/l) | | Ni Content (g/l) | Flow Rate (1/hr) | |
| 30.4 | 11.8 | 5.28 | 16.8 | 347.9 | 0.01 | 15.0 | 7.2 |
| 26.7 | 14.3 | 5.40 | 18.1 | 382.2 | 0.02 | 15.1 | 7.0 |
| 21.1 | 18.1 | 5.40 | 18.8 | 382.2 | 0.08 | 15.1 | 7.0 |
| 15.1 | 9.5 | 7.02 | 7.4 | 144.7 | 0.04 | 17.6 | 7.0 |
| 12.6 | 18.0 | 6.00 | 18.1 | 226.2 | 0.01 | 14.1 | 7.0 |

TABLE 2

| Scrubbed Organic Phase | | | | Scrub Raffinate | Degree of Na |
|---|---|---|---|---|---|
| Ni Content (g/l) | Na Content (g/l) | Scrubbing Ratio | Na/Ni (ppm) | Na/Ni (ppm) | Removal (%) |
| 30.4 | 0.0005 | 0.45 | 10 | $1.4 \times 10^4$ | 99.9 |
| 26.7 | 0.004 | 0.38 | 150 | $1.2 \times 10^4$ | 98.7 |
| 21.1 | 0.003 | 0.30 | 199 | $1.2 \times 10^4$ | 98.8 |
| 15.1 | 0.009 | 0.74 | 596 | $3.7 \times 10^4$ | 98.4 |
| 12.6 | 0.51 | 0.33 | $4.0 \times 10^4$ | $1.7 \times 10^4$ | — |

As is known from the nickel content of the extraction raffinate, which is shown in Table 1, the majority of nickel having existed in the crude nickel sulfate solution was extracted into the extractant when the pH of the extraction system was around 7, and the degree of nickel extraction was a high value of not smaller than 99.5%. Regarding the sodium removal in the scrubbing step, it is known from the data in Table 2 that sodium was more effectively removed from the nickel-loaded organic phase that had a higher nickel content. Specifically, when the nickel content of the nickel-loaded organic phase was higher than around 20 g/liter, the sodium removal from the phase was almost higher than 90%; but when it was lower than around 15 g/liter, the increase in the sodium removal could not be expected even when the flow rate of the scrub solution was increased to increase the scrubbing ratio, and even when the nickel content of the scrub solution was increased to increase the concentration ratio of Na/Ni thereby promoting the exchange reaction between sodium in the organic phase and nickel in the scrub solution. This is related to the fact that, when the pH of the extraction system is around 7, the amount of sodium to be extracted from the starting, crude nickel sulfate solution into the organic extract phase having a higher nickel content is lowered more.

The organic acid extractant, PC-88A having a concentration of 20% V/V, which was used in this experiment, has a stoichiometric nickel extraction of 18.3 g/liter. From the data obtained in this experiment, it is a-presumed that, when the nickel content of the organic phase obtained is not smaller than the stoichiometric nickel loading capacity of the extractant used, sodium is prevented from being extracted into the extractant along with nickel, and that the sodium removal from the organic phase is much more enhanced by the exchange between nickel in the nickel-containing scrub solution used and a minor amount of sodium existing in the organic phase.

Example 2

Herein made was an experiment to demonstrate the relationship between the nickel content of the nickel-loaded organic phase and the degree of removal of impurities, except sodium and ammonia, from the crude nickel sulfate solution to be purified, in the second purifying step of the exchange step of the invention. In this experiment, used was a continuous, four-stage counter-current mixer-settler system comprising four mixer-settlers as connected in series, in which the constitution of each mixer-settler was the same as that in the mixer-settler system used in Example 1, and in which the nickel-loaded organic phase as obtained in Example 1 was introduced into the first-stage mixer-settler along with an organic phase for dilution, while a crude nickel sulfate solution to be purified herein, which contained cobalt, calcium, magnesium, zinc and copper that are extracted into the organic acid extractant at a pH lower than that at which nickel is extracted thereinto, was introduced into the fourth-stage mixer-settler so that the two were reacted in a counter-current flow condition.

The flow rate of the nickel-loaded organic phase to be introduced into the first-stage mixer-settler while being combined with the organic phase for dilution was varied to fall between 10.8 liters/hr and 18.8 liters/hr. The flow rate of the crude nickel sulfate solution to be introduced into the fourth-stage mixer-settler was varied to fall between 10.7 liters/hr and 18.6 liters/hr. For convenience sake, the concentration of the crude nickel sulfate solution was controlled to be 100 g/liter, but the nickel content and the impurity content of both the organic phase and the aqueous phase were varied so as to check various equilibrated conditions of the two phases. Table 3 below shows the composition of the organic phase and that of the purified nickel sulfate solution obtained in this exchange experiment. During the exchange reaction, no hydrogen ions were released from the organic phase, and the pH of the organic phase was all the time stable and fell between 4.0 and 5.0 with no pH control.

TABLE 3

| Exchanged Organic Phase | | | | | | Purified Nickel Sulfate Solution | | | | | |
| --- | --- | --- | --- | --- | --- | --- | --- | --- | --- | --- | --- |
| Ni (g/l) | Co (g/l) | Ca (mg/l) | Mg (mg/l) | Zn (mg/l) | Cu (mg/l) | Ni (g/l) | Co (g/l) | Ca (mg/l) | Mg (mg/l) | Zn (mg/l) | Cu (mg/l) |
| 6.44 | 4.85 | 843 | 65 | 38 | 15 | 101 | 3 | 3 | 19 | <0.1 | <0.1 |
| 4.94 | 5.53 | 793 | 62 | 34 | 15 | 98.9 | 4 | 3 | 18 | <0.1 | <0.1 |
| 3.07 | 8.76 | 558 | 55 | 62 | 26 | 97.9 | 4 | 3 | 24 | <0.1 | <0.1 |
| 2.74 | 7.29 | 776 | 49 | 35 | 14 | 95.8 | 7 | 2 | 21 | <0.1 | <0.1 |
| 3.60 | 11.8 | 552 | 52 | 69 | 41 | 117 | 12 | 7 | 10 | <0.1 | <0.1 |
| 2.41 | 8.56 | 662 | 52 | 57 | 25 | 97.9 | 20 | 3 | 27 | <0.1 | <0.1 |
| 2.41 | 8.56 | 662 | 52 | 57 | 25 | 97.9 | 20 | 3 | 27 | <0.1 | <0.1 |
| 0.71 | 10.9 | 457 | 30 | 62 | 25 | 90.7 | 26 | 5 | 27 | <0.1 | <0.1 |

From the data in Table 3, it is known that the majority of impurities moved to the organic phase as a result of the exchange reaction and the impurity content of the purified nickel sulfate solution obtained was reduced. In addition, it is also known therefrom that, of the impurities, the degree of exchange cobalt is great and that the nickel content of the organic phase must be controlled to be at least 3 g/liter in order to make the purified nickel sulfate solution have a cobalt content of not larger than 10 mg/liter.

Table 4 below shows the data of the necessary nickel amount relative to the total amount of the impurities to be exchanged and on the basis of the cobalt content of the purified nickel sulfate solution obtained as a result of the exchange reaction, which were presumed from the nickel content of the exchanged organic phase. The data indicate that the necessary nickel equivalent to be in the nickel-loaded organic phase for effective exchange of the impurities existing in the crude nickel sulfate solution for nickel is not smaller than 1.3.

TABLE 4

| Necessary Nickel Equivalent (Ni + impurities)/(impurities) (Mol/Mol) | Co Content of Purified Nickel Sulfate Solution (mg/l) |
| --- | --- |
| 2.03 | 3 |
| 1.71 | 4 |
| 1.31 | 4 |
| 1.31 | 7 |
| 1.28 | 12 |
| 1.25 | 20 |
| 1.06 | 26 |

Example 3

For effective removal of impurities from the crude nickel sulfate solution in the exchange step, not only the nickel content of the nickel-loaded organic phase applied to the step but also the phase separation in the step into an aqueous phase and an organic phase must be well controlled. It is known that, when the organic phase has a too high cobalt content, its viscosity is too large resulting in that the phase separation is difficult. Having known this fact, the inventors herein made an experiment to demonstrate the influence of the cobalt content of the organic phase on the phase separation. In this experiment, used was the same organic acid extractant as that used in Example 1 to prepare different organic phases having a varying cobalt content. Each organic phase was mixed with the pure nickel sulfate solution that had been obtained in Example 2 at a ratio of 1/1, and the resulting mixture was put into a reactor equipped with a rotary stirrer capable of rotating at 1200 rpm, stirred therein at 35° C. for 20 minutes, and then kept static to determine the time for phase separation into an organic phase and an aqueous phase. The data obtained are shown in Table 5 below, from which it is known that the phase separation of the organic phase having a cobalt content of up to 11 g/liter was easy and was completed within a relatively short period of time, but the organic phase having a cobalt content of larger than 11 g/liter took a noticeably increased period of time for phase separation and effective exchange of the organic phase was impossible.

TABLE 5

| Organic Phase after Fourth-stage Exchange | | Aqueous Phase after Fourth-stage Exchange | | Time for Phase Separation (sec) |
| --- | --- | --- | --- | --- |
| Co Content (g/liter) | Ni Content (g/liter) | Co Content (g/liter) | Ni Content (g/liter) | |
| 4.85 | 8.92 | 0.22 | 132 | 90 |
| 9.33 | 0.06 | 0.015 | 100 | 81 |
| 11.8 | 3.60 | 0.010 | 117 | 5400 |

Example 4

Herein made was a systematic, continuous purification experiment including purification of crude nickel sulfate and recovery of cobalt, according to the flowchart shown in FIG. 1. In the steps of extraction, scrubbing and exchange herein, used were continuous, multi-stage counter-current mixer-settler systems which were the same as those used in the previous Examples, and the temperature condition in those systems was also the same as in the above. In this, a crude nickel sulfate solution was purified in the same manner as above. Table 6 below shows the number of stages of the multi-stage counter-current mixer-settler used in each step, the pH of the reaction system in each step, and the chemical used in each step for pH control (for the extraction step, shown was the concentration of the neutralizer used).

TABLE 6

| Step | Number of Stages | pH | Chemical for pH Control |
| --- | --- | --- | --- |
| Extraction | 2 | 6.9–7.0 | 200 g/l NaOH |
| Scrubbing | 3 | Not controlled | — |
| Exchange | 4 | Not controlled | — |
| Ni Stripping | 3 | 3.9–4.0 | 3N—$H_2SO_4$ |
| Co Recovery | 2 | 1.8–2.0 | 6N—HCl |
| Scrubbing of Organic Phase | 1 | 0–1.0 | 3N—$H_2SO_4$ |

TABLE 6-continued

| Step | Number of Stages | pH | Chemical for pH Control |
|---|---|---|---|
| Final Stripping | 1 | <0 | 3N—H$_2$SO$_4$ |

Table 7 below shows the composition of the organic phase and that of the aqueous phase in each step along with the flow rate of those phases therein. In Table 7, the numbered expression of the flow liquid corresponds to that in FIG. 1.

TABLE 7

| Flow Liquid | Flow Rate (l/hr) | Ni (g/l) | Co (g/l) | Ca (mg/l) | Mg (mg/l) | Cu (mg/l) | Zn (mg/l) | Na (mg/l) | NH$_3$ (mg/l) |
|---|---|---|---|---|---|---|---|---|---|
| Ni Sulfate Solution for Extraction | 11.9 | 16.1 | 0.06 | 89 | 82 | 52 | 3 | 875 | 180 |
| Scrub Solution | 8.0 | 10.3 | — | — | — | — | — | 78 | — |
| Final Organic Phase | 12.7 | — | 0.002 | — | — | — | — | — | — |
| Extraction Raffinate | 20.9 | 0.01 | — | — | — | — | — | 10100 | 102 |
| Ni-loaded Organic Phase | 12.7 | 20.7 | 0.064 | 84 | 97 | 49 | 69 | 3 | 1 |
| Bi Sulfate Solution for Exchange | 11.8 | 79.4 | 15.4 | 600 | 54 | 134 | 34 | 27 | 20 |
| Diluted Organic Phase | 10.0 | 6.54 | 0.021 | 27 | 31 | 16 | 22 | 1 | — |
| Scrubbed Organic Phase | 9.5 | 20.7 | 0.064 | 84 | 97 | 49 | 69 | 3 | 1 |
| Ni Sulfate Solution for Exchange | 11.8 | 96.1 | 0.005 | 2 | 34 | — | — | 30 | 20 |
| Exchanged Organic Phase | 19.5 | 3.35 | 9.33 | 415 | 75 | 80 | 66 | — | — |
| Recovered Ni Sulfate Solution | 4.8 | 13.5 | 8.9 | 276 | 78 | — | — | — | — |
| Organic Phase after Ni Recovery | 19.5 | 0.01 | 8.2 | 346 | 55 | 80 | 66 | — | — |
| Co Chloride Solution | 1.7 | 0.02 | 45.2 | 379 | 2300 | — | — | 2100 | — |
| Recovered Co Solution | 2.2 | 0.05 | 100 | 2900 | 2300 | 557 | 14 | 1700 | — |
| Organic Phase after Co Recovery | 19.5 | — | 0.09 | 54 | — | 23 | 64 | — | — |
| Scrub Raffinate from Organic Phase after Co Recovery | 3.9 | — | 4.3 | 82 | — | — | — | — | — |
| Scrubbed Organic Phase after Co Recovery | 19.5 | — | 0.035 | 54 | — | 6 | 64 | — | — |
| Final Stripping | 3.0 | — | 0.23 | 380 | — | 44 | 451 | — | — |

"—" indicates that the element content was smaller than 0.0001 g/liter.

In the extraction step of the first purifying step, the crude nickel sulfate solution was processed with an organic acid extractant, 20% V/V PC-88A at pH of 7 to thereby extract nickel from the solution into the extractant. In this, the nickel content of the resulting organic phase was 1.13 equivalents. After having been scrubbed, a part of the nickel-loaded phase extract was diluted with the pure final organic phase that had been obtained in the final stripping step so as to have a cobalt content of 30 mg/liter, and introduced into the first-stage mixer-settler in the exchange step of the second purifying step, at a flow rate of 10 liters/hr; while the remaining part thereof was into the third-stage mixer settler.

Based on the nickel content and the impurity content of the exchanged organic phase that had been discharged out of the fourth-stage mixer-settler after the exchange reaction therein, the amount of nickel as fed into the exchange step was found to be not smaller than 1.3 equivalents of the impurities removed in the exchange step. After the exchange reaction, the purified nickel sulfate solution was taken out of the fourth-stage mixer-settler. To indicate the degree of purification of the purified nickel sulfate solution obtained herein, Table 8 below shows the impurity content relative to Ni of the purified nickel sulfate solution obtained and that of the starting, crude nickel sulfate solution.

TABLE 8

| Relative to Ni (ppm) | Co | Ca | Mg | Cu | Zn | Na | NH$_3$ |
|---|---|---|---|---|---|---|---|
| Before Purified | 1.5 × 10$^5$ | 6.7 × 10$^3$ | 1.3 × 10$^3$ | 1.8 × 10$^3$ | 361 | 9.4 × 10$^3$ | 2.0 × 10$^3$ |
| After Purified | 52 | 21 | 354 | <10 | <10 | <10 | <10 |

The third purifying step of selective nickel stripping was to recover nickel still remaining in the exchanged organic phase as obtained in the second purifying step, in which was used a three-stage counter-current mixer-settler system. As the extractant for nickel stripping in this step, used was 3 N sulfuric acid that had been diluted with distilled water to have pH of about 4.0, and nickel still remaining in the exchanged organic phase was stripped into the extractant as nickel sulfate. In this third purifying step, it is important that nickel is fully recovered from the organic phase in such a degree that no nickel remains in the processed organic phase, and that the organic phase with little nickel is transferred into the next impurities-removing step.

This is because the exchanged organic phase is transferred to the next optional step of cobalt recovery, in which cobalt existing in the organic phase is recovered as cobalt chloride, and nickel, if any, in the thus-recovered cobalt chloride interferes with the additional electrolytic purification of cobalt chloride to give high-purity cobalt. As in Table 7, the ratio of Ni/Co in the organic phase after nickel recovery that had been obtained in the third purification step of selective nickel stripping was about 0.001, from which it is known that the nickel back-extraction in this step produced a good result. The recovered nickel sulfate solution as obtained through this selective nickel stripping could be collected directly as a pure nickel sulfate solution. Preferably, however, this is recycled to the exchange step of the second purifying step, whereby the amount of the crude nickel sulfate solution containing impurities such as sodium and ammonia, which is fed to the second purifying step for exchange, can be reduced and a purified nickel sulfate solution having a higher purity can be obtained in the second purifying step.

The organic phase after nickel recovery, which had been processed in the third purifying step to recover nickel from it, was then transferred to the next step of cobalt recovery in which cobalt remaining in the thus-transferred organic phase was separated from the phase and recovered. In this step, the organic phase was processed with a strip solution, 6 N hydrochloric acid as diluted with distilled water to have pH of from 1.4 to 2.0, to thereby extract cobalt from the organic phase into the extractant as cobalt chloride having a concentration of about 45 g/liter, and the majority of cobalt having remained in the organic phase was recovered. In this step, cobalt was recovered as cobalt chloride for the intended electrolytic purification of the recovered cobalt chloride to give high-purity cobalt. The strip solution for cobalt recovery is not limited to only hydrochloric acid used herein, but may be nitric acid with which cobalt is recovered from the organic phase as cobalt nitrate. The recovery of cobalt chloride as herein is advantageous in that the electrolytic purification of the recovered cobalt chloride can be effected economically as the recovered cobalt chloride can be concentrated to have a concentration of up to 100 g/liter.

After the cobalt recovery therefrom, the organic phase was scrubbed with a diluted sulfuric acid solution as prepared by adding distilled water to sulfuric acid, in the next step. This was to remove chloride ions from the organic phase. In this scrubbing step, a small amount of cobalt and calcium still remaining in the organic phase was partly stripped into the scrub raffinate. If desired, cobalt may be separated from calcium and recovered from the scrub raffinate through neutralization or the like. In the final stripping step, the organic phase having been scrubbed in the previous scrubbing step was processed with 3 N sulfuric acid for stripping of copper, zinc, cobalt and calcium having still remained in the scrubbed organic phase into the extractant, sulfuric acid. As a result of this final stripping, those impurity elements were separated and removed from the organic phase as in Table 7. Needless-to-say, iron, if any, in the organic phase could be separated and removed from it in the same manner as hereinabove. If desired, the final stripping may be processed with chloric acid to recover therefrom cobalt as cobalt hydroxide.

The final organic phase with no impurities that had been obtained in the final stripping step was sent to the extraction step of the first purifying step and used as the organic acid extractant for the extraction of the starting, crude nickel sulfate solution; while a part of it was added to a part of the scrubbed organic phase that had been obtained in the first purifying step, as the organic phase for diluting the cobalt concentration of the scrubbed organic phase. In that recirculation manner, the amount of the fresh, organic acid extractant to be used in the first purifying step was much reduced.

In the present invention mentioned in detail hereinabove, the combination of the solvent extraction step using an organic acid extractant and the exchange step has final stripping step, the organic phase having been scrubbed in the previous scrubbing step was processed with 3 N sulfuric acid for stripping of copper, zinc, cobalt and calcium having still remained in the scrubbed organic phase into the extractant, sulfuric acid. As a result of this final stripping, those impurity elements were separated and removed from the organic phase as in Table 7. Needless-to-say, iron, if any, in the organic phase could be separated and removed from it in the same manner as hereinabove. If desired, the final stripping may be processed with chloric acid to recover therefrom cobalt as cobalt hydroxide.

The final organic phase with no impurities that had been obtained in the final stripping step was sent to the extraction step of the first purifying step and used as the organic acid extractant for the extraction of the starting, crude nickel sulfate solution; while a part of it was added to a part of the scrubbed organic phase that had been obtained in the first purifying step, as the organic phase for diluting the cobalt concentration of the scrubbed organic phase. In that recirculation manner, the amount of the fresh, organic acid extractant to be used in the first purifying step was much reduced.

In the present invention mentioned in detail hereinabove, the combination of the solvent extraction step using an organic acid extractant and the substitution step has realized easy and high-yield production of pure nickel sulfate not contaminated with sodium and ammonia, which was impossible in the conventional solvent extraction process. In addition, in the invention, the amount of the neutralizer to be used is reduced and the cost of treating wastewater is also reduced. Where the method of the invention is combined with an optional step of cobalt recovery, the valuable metal, cobalt can be effectively recovered from a crude nickel sulfate solution containing a large amount of cobalt. Thus, the method of the invention has the advantage of being economical in industrial purification of a crude nickel sulfate solution.

What is claimed is:

1. A method of purifying a crude nickel sulfate solution that contains impurities of sodium, ammonia and other elements selected from the group consisting of cobalt, calcium, copper, zinc and iron, to provide a purified nickel sulfate solution, which comprises the steps of:

(a) a first purifying extraction step of adding an organic acid extractant to a first crude nickel sulfate solution to extract nickel, sodium and ammonia into the organic acid extractant to provide a nickel-loaded organic phase, (b) a scrubbing step of scrubbing the nickel-loaded organic phase with a nickel-loaded scrub solution to remove sodium and ammonia from the nickel-loaded organic phase and provide a scrubbed nickel-loaded organic phase, and (c) a second purifying step of adding a second crude nickel sulfate solution containing impurities of sodium, ammonia, and other elements selected from the group consisting of cobalt, calcium, copper, zinc and iron to the scrubbed nickel-loaded organic phase to exchange the nickel in the scrubbed nickel-loaded organic phase for the impurities except sodium and ammonia in the second crude nickel sulfate solution, thereby providing a purified nickel sulfate solution and an organic phase containing impurities.

2. The method of purifying a crude nickel sulfate solution as claimed in claim 1, wherein a crude nickel sulfate solution containing a relatively large amount of sodium and ammonia is used in the first purifying step, while a crude nickel sulfate solution containing a relatively small amount of sodium and ammonia is used in the second purifying step.

3. The method of purifying a crude nickel sulfate solution as claimed in claim 1, wherein the nickel content of the nickel-loaded organic phase obtained in the extraction step is made larger than the stoichiometric nickel loading capacity of the organic acid extractant used.

4. The method of purifying a crude nickel sulfate solution as claimed in claim 1, which further comprises a third purifying step of adding diluted sulfuric acid to the organic phase containing impurities as obtained in step (c) to strip nickel remaining in the organic phase containing impurities into the diluted sulfuric acid, thereby giving a purified nickel sulfate solution and an organic phase with concentrated impurities.

5. The method of purifying a crude nickel sulfate solution as claimed in claim 4, wherein the purified nickel sulfate solution obtained in the third purifying step is recycled to the second purifying step.

6. The method of purifying a crude nickel sulfate solution as claimed in claim 4, wherein the organic phase with concentrated impurities is subjected to a cobalt-recovering step where hydrochloric acid is added to the organic phase to strip cobalt existing in the organic phase into the hydrochloric acid to recover cobalt as cobalt chloride.

7. The method of purifying a crude nickel sulfate solution as claimed in claim 6, wherein the organic phase having been subjected to the cobalt-recovering step and therefore containing impurities except cobalt is scrubbed, and then processed with sulfuric acid to strip the impurities except cobalt into the sulfuric acid so as to remove the impurities from the organic phase, and a part of the resulting, impurities-free organic phase is recycled to the extraction step in the first purifying step to be used therein as a part of the organic acid extractant.

8. The method of purifying a crude nickel sulfate solution as claimed in claim 7, wherein the remaining part of the impurities-free organic phase obtained in the previous impurities stripping step is used for diluting the nickel-loaded organic phase obtained in the scrubbing step in the first purifying step.

* * * * *